June 18, 1963   J. H. EAGLE ETAL   3,094,034
FILM STRIP FOR INDEXING SYSTEM

Filed March 16, 1956   2 Sheets-Sheet 1

John H. Eagle
John E. Morse
INVENTORS

BY
ATTORNEYS

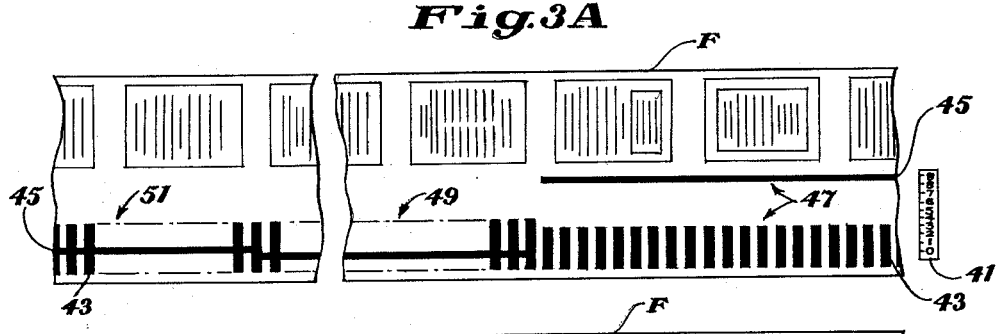
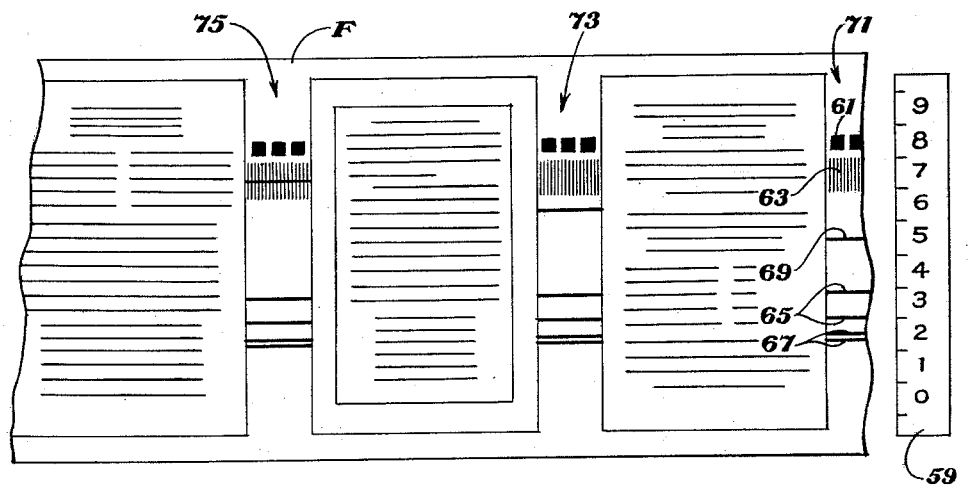

United States Patent Office 3,094,034
Patented June 18, 1963

3,094,034
FILM STRIP FOR INDEXING SYSTEM
John H. Eagle and John E. Morse, Rochester, N.Y., assignors to Eastman Kodak Company, Rochester, N.Y., a corporation of New Jersey
Filed Mar. 16, 1956, Ser. No. 571,983
1 Claim. (Cl. 88—24)

This invention relates to an indexing system and more particularly to an arrangement of marks on a film strip to assist in the rapid visual determination of the location of a particular image on the film strip.

One of the problems encountered by organizations which photograph records and documents on microfilm for future reference is the locating of a given image on the film roll containing many document images. The locating of the desired image is time consuming and frequently unduly tires the operator of the film reader or other viewing device. It is well known to photograph certain indicia such as for example a number, along a margin of a film strip for identifying a group of related images or a film footage, however, the indicia like the document itself is not recognizable to the human eye when the film strip is being advanced through the viewing device with any but the extremely slowest of speeds. The present invention has been devised to eliminate this very undesirable feature in the inspection of microfilm records and to provide a simple and effective indexing system for assisting in the rapid visual determination of the location of a given image among the many images recorded on the film roll. According to the invention, a multiple valued mark or a multiplicity of marks are arranged on the film strip so as to uniquely identify various portions of the film strip by combination with themselves and with their lateral position on the film strip. Mark value can be indicated by both the visual characteristics of the mark as determined by combinations of color, apparent density and transverse shape, and by the lateral position of the mark on the film strip, thus enabling a very great number of unique combinations to be utilized for designating the different longitudinal positions on the film strip. The marks projected onto the screen of the viewing device as the film strip is rapidly advanced through the viewing device, appear to be continuous because of the persistance of vision of the human eye and are, therefore, capable of being recognized and evaluated by the operator by merely comparing the marks with a scale fixed to the screen of the viewing device.

The primary object of the present invention is, therefore, to provide an indexing system permitting the rapid visual determination of the location of any given image on a film strip carrying many discrete images.

Another object of the present invention is to provide an indexing system comprising a series of marks placed in a sequential order longitudinally of a film strip to permit the rapid visual determination of the location of any given image on a film strip carrying many discrete images.

Yet another object of the present invention is to provide an indexing system permitting the rapid visual determination of the location of any given image on a film strip carrying many discrete images and comprising a series of marks placed on the film strip between successive images in a sequential order longitudinally of the film strip and which are projected onto the screen of a viewing device as the film strip is rapidly advanced therethrough and are recognizable and capable of being evaluated by the operator by comparison with a scale fixed to the screen of the viewing device.

Still other objects and advantages of the present invention will be recognized by those skilled in the art from the following description with reference to the drawings in which like characters denote like parts and wherein:

FIGS. 3A and 3B illustrate sections of a film strip provided with index marks according to another embodiment of our invention; and FIG. 4 illustrates a section of the film strip provided with index marks according to still another embodiment of our invention.

Figure 1:
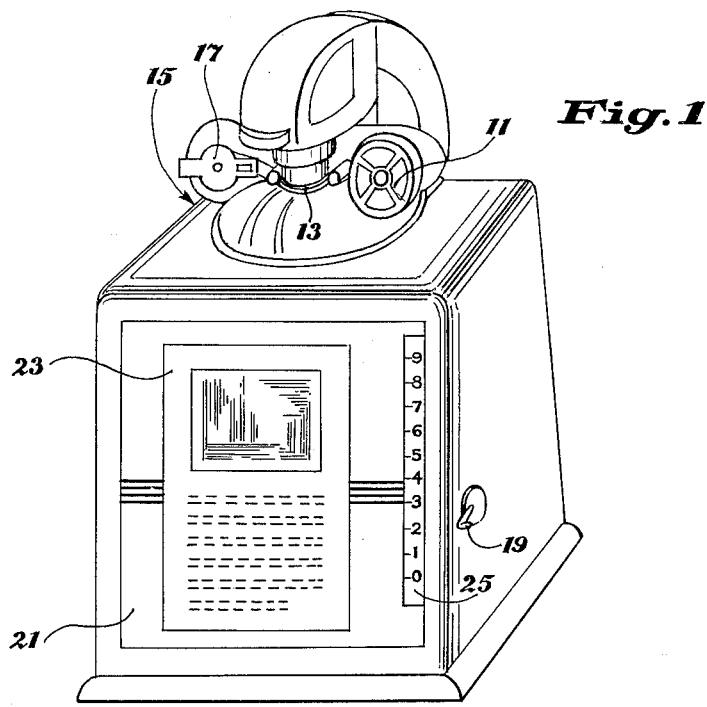
FIG. 1 shows a viewing device utilized in accordance with our invention.

In FIG. 1, we have illustrated a microfilm viewing device or as more frequently referred to in the art, a film reader. The construction and operation of such film readers, which are commercially available, is well kown in the art and hence will not be discussed in detail here. Suffice it to say that the film strip containing many discrete document images is transported from a supply spool 11 through the optical glass flats 13 in the rotatable projector head 15 and onto the take-up spool 17. The film strip is wound from one spool to the other by means of a crank 19 located on the side of a film reader, and the images on the film strip are enlarged and projected onto the viewing screen 21 forming the front face of the film reader. At 23, on the screen 21, we have illustrated the projected image of a recorded film strip image. A scale 25 for comparing and interpreting index marks placed between the successive images on the film strip, is affixed to the viewing screen 21 adjacent the vertical side edge of the screen.

Figure 2A:
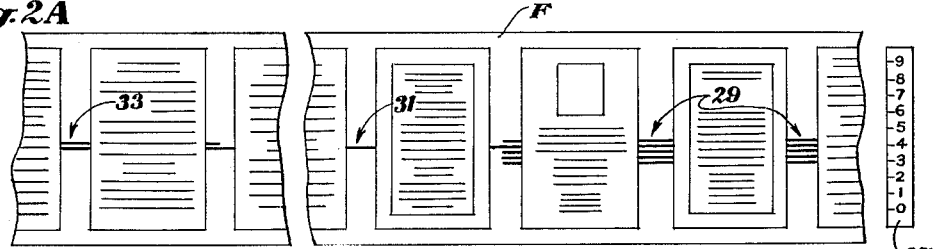
FIGS. 2A and 2B illustrate sections of a film strip provided with index marks according to the preferred embodiment of our invention.
Figure 2B:
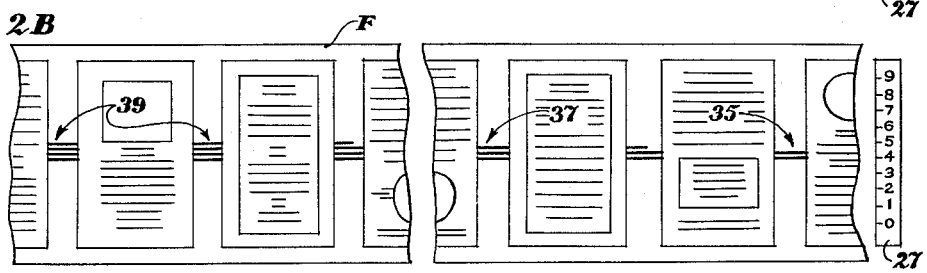

In FIGS. 2A and 2B, we have illustrated sections of a film strip F provided with a series of index marks according to the preferred embodiment of our invention. We have shown a small scale 27 adjacent the ends of the sections of film strips F in FIGS. 2A and 2B, in order to facilitate the description of the FIGS. The scales 27 have the same relation to the film strips F that the scale 25 has to the projected image 23 on the screen 21 of the film reader illustrated in FIG. 1. According to the invention, a series of horizontal lines constituting index marks are positioned between the successive images on the film strip F, these lines being arranged in a predetermined pattern and in varying transverse positions on the film strip to designate different values. The values of the index marks are determined by comparing the projected images of the index marks with the fixed scale 25. The vertical position of the lowest horizontal line forming the index mark indicates the value of the tens digit of a two digit number and the number of horizontal lines transverse of the film strip forming the index mark indicates the value of the units digit of the number. Thus the value of the index mark indicated at 29 is thirty-five. The value indicated at 31 is forty-one and at 33 is forty-two. In FIG. 2B the value of the mark indicated at 35 is forty-two, at 37 is forty-three and at 39 is forty-four.

Since most documents photographed on microfilm are usually white or of another light color and are printed in black or another dark color, the document image on the film strip is generally a dark gray with the letters of the printed material appearing clear or transparent. The marginal edges of the film strip adjacent the document images are transparent, as is the area of the film strip between successive document images, which area is approximately equal to ⅓ the area of the document image. Under these circumstances, when the film strip is rapidly advanced through a film reader no projected image of the document can be distinguished on the screen, which because of the persistence of vision of the human eye, appears to be continuously lighted from the light which passes through the transparent areas on the film strip. In practicing the invention, an index mark such as that at 29 is recorded as a series of black lines on the transparent portion of the film strip and is repeated between successive document images over a substantial distance longitudinally of the film strip. Because of the persistence of the vision of the human eye, the lines forming the mark appear continuous on the screen of the film reader as the film strip is rapidly advanced therethrough, and it becomes a simple matter for an operator to compare the index marks with the scale 25 on the viewing screen 21 of the film reader to determine the value of any given mark, and hence, the longitudinal position of the film strip in the film reader at any given time. Thus, by referring to a previously prepared record and determining therefrom the value of the index mark which was used to identify the section of the film strip on which the image of a given document was recorded, one is then able to quickly locate that section by rapidly moving the film strip through the film reader until the correspondingly valued mark appears, and thereby greatly reduce the time formerly required to locate a given image among the many images recorded on the roll of film strip. It has been found that an operator of the film reader can readily distinguish five or less horizontal lines making up an index mark and, therefore, with 10 scale markings of zero through nine inclusive, it is possible to have only 50 unique marks. This would permit a different mark to be used to identify, for example, each successive 2-foot section of a 100-foot roll of film strip.

In FIGS. 3A and 3B, we have illustrated another embodiment of our invention in which the sections of the film strip F are provided with a two digit code arranged between the edge of document images and the marginal edge of the film strip. The utilization of the index marks in this manner requires that the document images on the film strip be reduced from the desirable full width size indicated in FIGS. 2A and 2B and also necessitates the utilization of a scale (not shown) on the screen 21 of the film reader, which is about ½ as large as the scale illustrated at 25 in FIG. 1. We have shown a small scale 41 adjacent the ends of the sections of film strips F in FIGS. 3A and 3B in order to facilitate the description of these figures. The scale 41 has the same relation to the film strip F shown in FIGS. 3A and 3B as would the scale, not shown, have to the projected image of the film strip on the viewing screen 21 of the film reader. When using the index marks of this embodiment, the vertical height of the bars 43 indicates the tens digit of a two digit number and the vertical position of the horizonal lines 45 indicates the units digit of the number as measured by the scale 41. Thus in FIG. 3A the value of the index mark indicated at 47 is thirty-nine, at 49 is forty, at 51 is forty-one. Similarly in FIG. 3B the value of the index mark indicated at 53 is forty-two, at 55 is forty-three, and at 57 is forty-four. When a film strip F carrying index marks of the type illustrated in FIGS. 3A and 3B is rapidly advanced through a film reader such as illustrated in FIG. 1, the vertical bars 43 appear to be a gray area on the screen 21 and the vertical height is readily compared with the scale (not shown) fixed on the screen. The horizontal lines 45 appear black and continuous on the screen 21 and are also readily compared with the scale (not shown) fixed on the screen. One advantage of the indexing system utilizing the coded marks of this embodiment is that with ten scale markings of zero through nine inclusive, it is possible to have 100 unique marks permitting a different mark to be used to identify, for example, each successive one foot section of a 100 foot roll of film strip.

In FIG. 4 we have illustrated yet another embodiment of our invention in which the film strip F is provided with a five digit code arranged between the successive document images in a manner similar to that illustrated in the preferred embodiment. In utilizing this embodiment a scale (not shown) slightly different from that needed in the prior discussed embodiments is required. The scale (not shown) which is affixed to screen 21 and of which the scale 59 can be considered a reduced replica is provided with equally spaced markings to indicate different transverse areas. The areas on the scale 59 are numbered with a series of digits from zero to nine. The tens of thousands digit of the code of this embodiment is indicated by small black squares as at 61. The thousands digit is indicated by a series of short black vertical lines as at 63. The hundreds digit is indicated by relatively widely spaced parallel horizontal black lines as at 65, the tens digit by relatively closely spaced parallel horizontal black lines as at 67 and the units digit by a single horizontal black line as at 69 which is centered in the transverse area. Thus the value of mark indicated at 71 in FIG. 4 is eighty-seven thousand three hundred twenty five, at 73 is eighty seven thousand three hundred twenty six and at 75 is eighty-seven thousand three hundred twenty seven. When the film strip F carrying index marks of the type illustrated in FIG. 4 is rapidly advanced through a film reader such as illustrated in FIG. 1 the small squares 61 indicating the tens of thousanads digit appear as a relatively dark gray horizontal area on the screen 21 of the reader. The vertical lines 63 indicating the thousands digit appear as a light gray horizontal area on the screen 21 and the horizontal lines indicating the hundreds digit, the tens digit, and the units digit appear as continuous horizontal black lines on the screen 21 as was explained in regard to the preferred embodiment illustrated in FIGS. 2A and 2B. One advantage obtained by the utilization of the index system illustrated in FIG. 4 is that the code representing any digit can be recognized when superimposed on any combination of codes representing the other digits, which provides one hundred thousand unique index marks for designating different successive portions of the film strip F.

While we have disclosed the utilization of two forms of index marks between the successive docuument images and one form of index mark which occupies a portion of the film strip between the document images and the margin of the film strip, it should be understood that any of the index marks can be utilized with equal expediency between the successive document images or between the document images and the margin of the film strip. In either event, the index marks on the film strip appear continuous to the human eye when projected onto the viewing screen 21 of a film reader as the film strip is rapidly advanced therethrough because of the persistence of vision of the human eye. The term "document" as used in the specification and claim is intended to define any record which one desires to photographically record on a film strip including for example, photographs, drawings, checks, invoices or any other written or printed material.

It will now be appreciated by those skilled in the art that the index system of our invention permits the rapid visual determination of the location of any given image on a film strip carrying many images by comparison of the projected image of a series of marks placed in a sequential order and transversely spaced on the film strip with a scale fixed to the screen of a viewing device.

While we have described only three embodiments of our invention, many modifications and variations are possible and will be readily recognized by those skilled in the art and, therefore, the present disclosure is intended to be illustrative only and the scope of the invention is defined by the appended claim.

Having now particularly described our invention what we desire to secure by Letters Patent of the United States and what we claim is:

A film strip having a series of images recorded thereon and bearing an indexing code comprising a series of marks arranged between successive images on said film strip in juxtaposition with said images for denoting successive longitudinal sections of said film strip, each mark in said series of marks being repeated throughout the one of said sections which that mark uniquely identifies and representing an identifying unit therefor having at least two characters, each mark including at least two separate and distinct elements each indicating by its transverse position on said film strip a different one of said characters, and each element having a predetermined shape which is discernable and distinguishable when the mark of which it is a part is stationary and when moved rapidly through a given area of view, whereby each mark presents a visibly distinct pattern.

References Cited in the file of this patent

UNITED STATES PATENTS

| | | |
|---|---|---|
| 1,889,575 | Sebille | Nov. 29, 1932 |
| 2,209,267 | Gorochov | July 23, 1940 |
| 2,760,404 | King | Aug. 28, 1956 |
| 2,761,351 | Gehring et al. | Sept. 4, 1956 |